United States Patent
Gupta

(10) Patent No.: US 11,441,897 B2
(45) Date of Patent: Sep. 13, 2022

(54) BAROMETRIC PRESSURE SENSOR CALIBRATION IN AN ELECTRONIC DEVICE

(71) Applicant: MOTOROLA MOBILITY LLC, Chicago, IL (US)

(72) Inventor: Ranjeet Gupta, Naperville, IL (US)

(73) Assignee: Motorola Mobility LLC, Chicago, IL (US)

(*) Notice: Subject to any disclaimer, the term of this patent is extended or adjusted under 35 U.S.C. 154(b) by 148 days.

(21) Appl. No.: 16/862,414

(22) Filed: Apr. 29, 2020

(65) Prior Publication Data

US 2021/0341286 A1 Nov. 4, 2021

(51) Int. Cl.
*G01C 5/06* (2006.01)
*G01L 7/12* (2006.01)

(52) U.S. Cl.
CPC . *G01C 5/06* (2013.01); *G01L 7/12* (2013.01)

(58) Field of Classification Search
CPC ..................................... G01C 5/06; G01L 7/12
See application file for complete search history.

(56) References Cited

U.S. PATENT DOCUMENTS

| | | | | |
|---|---|---|---|---|
| 6,055,477 A * | 4/2000 | McBurney | ............... | G01C 5/00 701/469 |
| 6,518,918 B1 * | 2/2003 | Vannucci | ................. | G01C 5/06 342/174 |
| 7,429,948 B2 * | 9/2008 | Burgett | .................... | G01C 5/06 342/118 |
| 2006/0000286 A1 * | 1/2006 | Makela | ..................... | G01C 5/06 73/700 |
| 2016/0047649 A1 * | 2/2016 | Edge | ........................ | H04B 1/40 455/73 |
| 2018/0073951 A1 * | 3/2018 | Venkatraman | ........ | H04W 4/025 |
| 2019/0360804 A1 * | 11/2019 | Dormody | ............... | G06F 17/18 |

FOREIGN PATENT DOCUMENTS

JP 201715438 * 1/2017 ............. G01C 15/00

OTHER PUBLICATIONS

Li, Binghao et al., "Using Barometers to Determine the Height for Indoor Positioning", 2013 International Conference an Indoor Positioning and Indoor Navigation, Oct. 28-31, 2013.

* cited by examiner

*Primary Examiner* — Eman A Alkafawi
*Assistant Examiner* — Aeysha N Sultana
(74) *Attorney, Agent, or Firm* — Isidore PLLC

(57) ABSTRACT

A method, an electronic device, and a computer program product for calibrating a barometric pressure sensor in an electronic device. The method includes receiving, via a processor of an electronic device, first altitude data from a first wireless access point and triggering a barometric pressure sensor of the electronic device to transmit second altitude data. The method further includes receiving the second altitude data and determining a first difference between the first altitude data and the second altitude data. The method further incudes determining if the first difference is greater than an altitude difference threshold, and in response to determining that the first difference is greater than the altitude difference threshold, triggering the barometric pressure sensor to calibrate, based on the first altitude data.

17 Claims, 5 Drawing Sheets

BAROMETRIC PRESSURE SENSOR CALIBRATION IN AN ELECTRONIC DEVICE

BACKGROUND

1. Technical Field

The present disclosure generally relates to electronic devices and in particular to barometric pressure sensor calibration in an electronic device.

2. Description of the Related Art

Modern personal electronic devices, such as mobile devices and cell phones, are often equipped with a barometer or barometric pressure sensor. The barometric pressure sensor measures air pressure in the ambient environment. Barometric pressure sensors can be used to determine altitude above sea level where the device is located.

In devices that integrate barometric pressure sensors to determine the altitude of the device, the barometric pressure sensors can drift out of calibration and require re-calibration in order to maintain accuracy.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
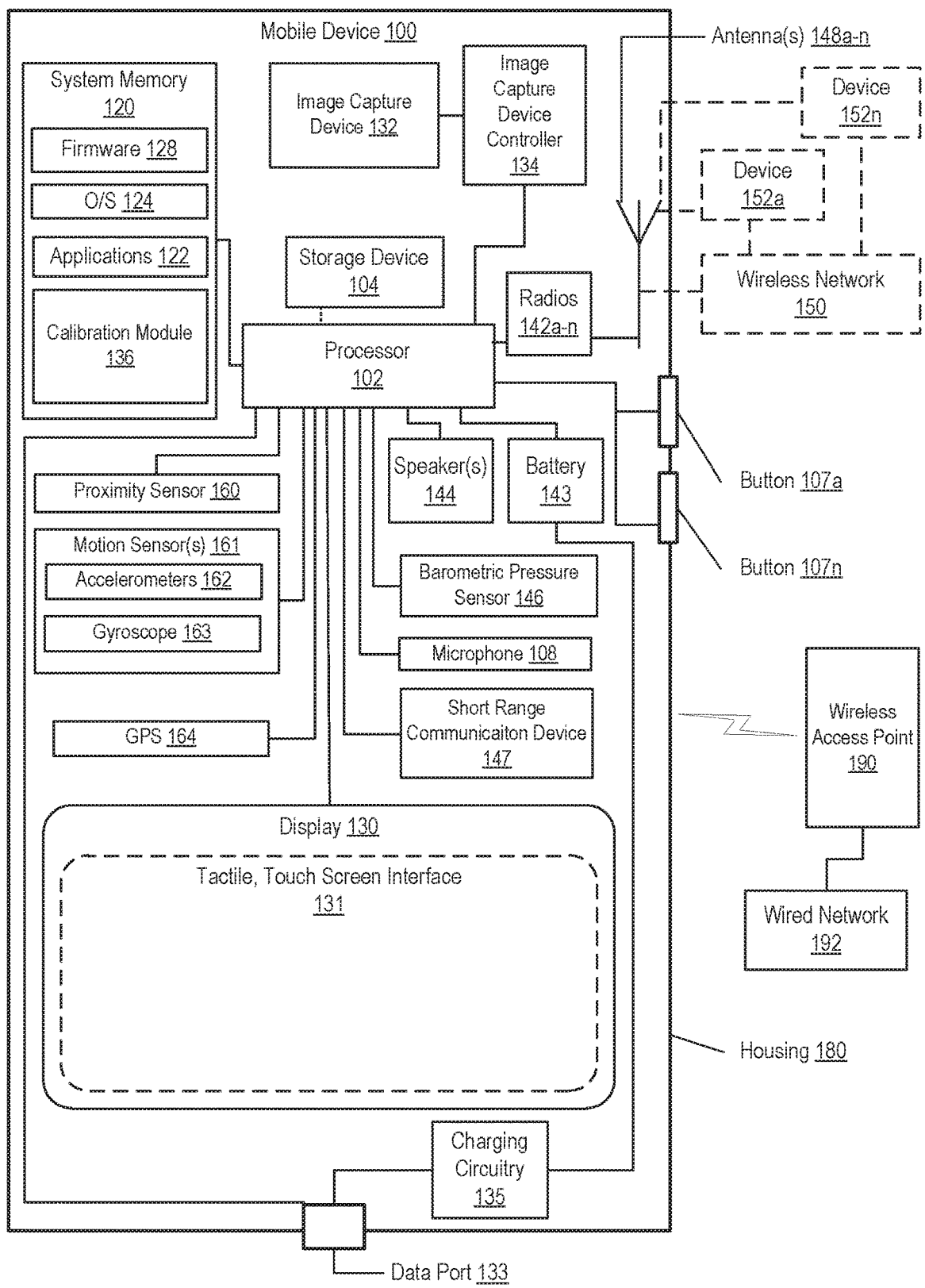
FIG. 1 depicts an example mobile device within which various aspects of the disclosure can be implemented, according to one or more embodiments.

The illustrative embodiments provide a method, an electronic device, and a computer program product for calibrating a barometric pressure sensor (BPS) in an electronic device. The method includes receiving, via a processor of the electronic device, first altitude data from a first wireless access point in proximity to the electronic device and triggering the BPS of the electronic device to send second altitude data to the processor. The method further includes determining a first difference between the first altitude data and the second altitude data. The method further incudes determining if the first difference is greater than an altitude difference threshold. In response to determining that the first difference is greater than the altitude difference threshold, triggering the barometric pressure sensor to calibrate based on the first altitude data.

According to another embodiment, an electronic device includes a barometric pressure sensor and a memory having stored thereon an altitude difference threshold and a calibration module for calibrating the barometric pressure sensor. The electronic device further includes a short-range communication device that enables communication with at least one wireless access point in proximity to the electronic device. The electronic device further includes at least one processor communicatively coupled to the barometric pressure sensor, the memory, and the short-range communication device. The at least one processor executes program code of the calibration module which enables the electronic device to receive first altitude data from the at least one wireless access point and to trigger the barometric pressure sensor to transmit second altitude data. The electronic device is further enabled to determine a first difference between the first altitude data and the second altitude data. The electronic device is further enabled to retrieve the altitude difference threshold from the memory. The electronic device is further enabled to determine if the first difference is greater than the altitude difference threshold. In response to determining that the first difference is greater than the altitude difference threshold, trigger the barometric pressure sensor to calibrate based on the first altitude data.

According to an additional embodiment, a computer program product includes a computer readable storage device and program code on the computer readable storage device. When executed within a processor associated with an electronic device, the program code enables the device to provide the various functionality presented in the above-described method processes.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the following figures and the remaining detailed written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within mobile device (100, FIG. 1) are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

FIG. 1 depicts example mobile device 100 within which various aspects of the disclosure can be implemented, according to one or more embodiments. Examples of such mobile devices include, but are not limited to, a laptop computer, a notebook computer, a mobile phone, a digital camera, a tablet computer/device, and a smart-watch, etc. Mobile device 100 includes processor 102, which is communicatively coupled to storage device 104, system memory 120, display 130, image capture device controller 134, wireless communication radios 142a-n, and other components described herein.

System memory 120 may be a combination of volatile and non-volatile memory, such as random access memory (RAM) and read-only memory (ROM). System memory 120 can store program code or similar instructions associated with applications 122, an operating system 124, firmware 128, and calibration module 136. Although depicted as being separate from firmware 128 and applications 122, calibration module 136 may also be implemented as a portion of firmware 128 or application 122. Processor 102 loads and executes program code stored in system memory 120. Examples of program code that may be loaded and executed by processor 102 include program code associated with applications 122 and program code associated with calibration module 136.

Display 130 can be one of a wide variety of display screens or devices, such as a liquid crystal display (LCD) and an organic light emitting diode (OLED) display. In the illustrated embodiments, display 130 is a touch screen device that includes a tactile, touch screen interface 131 that allows a user to provide tactile/touch input to or control mobile device 100 by touching the display screen.

In one embodiment, image capture device 132 is communicatively coupled to image capture device controller 134, which is communicatively coupled to processor 102. Image capture device 132 can capture images that are within the field of view of image capture device 132.

Radios 142a-n are coupled to antennas 148a-n. Radios 142a-n and antennas 148a-n allow mobile device 100 to communicate wirelessly with external devices 152a-n via wireless network 150. In one embodiment, external devices 152a-n can be radios (i.e., wireless signal transmitters and receivers) located at various cellular communication towers.

Mobile device 100 can further include data port 133, which is connected with processor 102 and charging circuitry 135. Charging circuitry 135 enables external charging of battery 143 via power input through data port 133. Mobile device 100 further includes microphone 108, one or more speakers 144, and one or more buttons 107a-n. Buttons 107a-n may provide controls for volume, power, and image capture device 132, etc.

Mobile device 100 further includes proximity sensor 160 and motion sensor(s) 161 that are communicatively coupled to processor 102. Proximity sensor 160 can be an infrared (IR) sensor that detects the presence of a nearby object. Motion sensor(s) 161 can include one or more accelerometers 162 and gyroscope 163. Motion sensor(s) 161 can detect movement of mobile device 100 and provide, to processor 102, motion data that indicate the spatial orientation and movement of mobile device 100.

Accelerometers 162 measure linear acceleration of movement of mobile device 100 in multiple axes (X, Y and Z). For example, accelerometers 162 can include three accelerometers, where one accelerometer measures linear acceleration in the X axis, one accelerometer measures linear acceleration in the Y axis, and one accelerometer measures linear acceleration in the Z axis. Gyroscope 163 measures rotation or angular rotational velocity of mobile device 100.

Mobile device 100 further includes additional components, such as global positioning system (GPS) module 164, BPS 146 and short-range communication device 147. GPS module 164 can receive location and time data from GPS satellites. BPS 146 measures air pressure of the environment surrounding mobile device 100. BPS 146 is communicatively coupled to processor 102 and provides an electrical signal to the processor corresponding to the measured air pressure. In one embodiment, BPS 146 can provide pressure measurements in various units including pounds per square inch, millibars, pascals or newtons per square meter. BPS 146 can also calculate an altitude above sea level that corresponds to the air pressure measured by BPS 146 and provide the altitude value to the processor 102.

Short-range communication device 147 is a low powered transceiver that wirelessly communicates with wireless access point (WAP) 190. Short-range communication device 147 can be a variety of devices, such as a near field communication (NFC) device, a Bluetooth device or a wireless fidelity (Wi-Fi) device. Mobile device 100 further includes a housing 180 that contains the component of mobile device 180.

WAP 190 is a networking hardware device that allows short-range communication devices to connect to wired network 192 such as the Internet or to other wireless networks. In one embodiment, WAP 190 can be a router.

Figure 2:
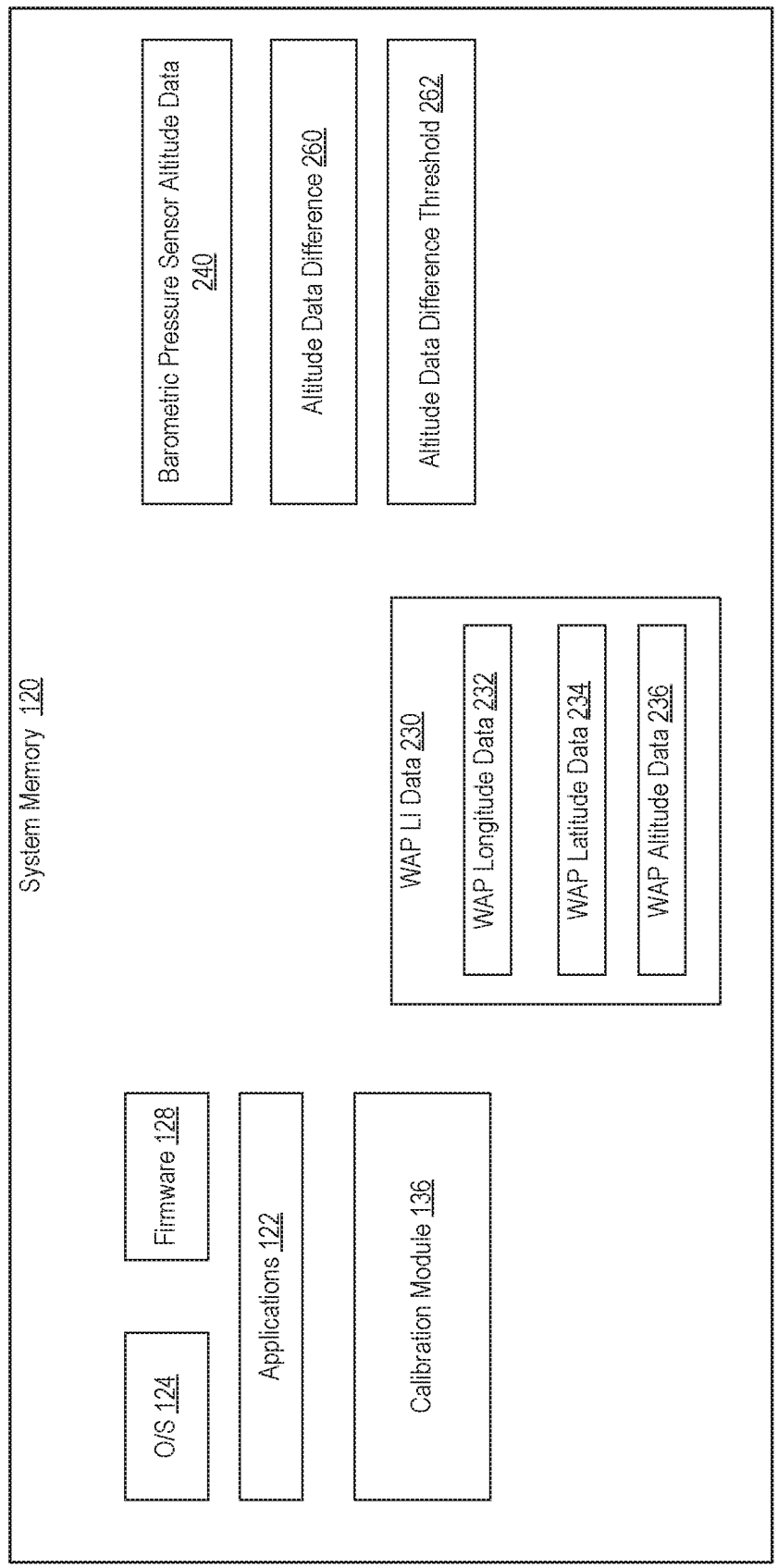
FIG. 2 is a block diagram of example contents of the system memory of the mobile device, which is configured to provide the novel features of the disclosure, according to one or more embodiments.

In the description of each of the following figures, reference is also made to specific components illustrated within the preceding figure(s). With reference now to FIG. 2, one embodiment of example contents of system memory 120 of mobile device 100 is shown. System memory 120 includes data, software, and/or firmware modules, including applications 122, operating system 124, firmware 128, and calibration module 136. Calibration module 136 enables the calibration of BPS 146. In one embodiment, calibration module 136 is executed on processor and enables processor 102, and by extension mobile device 100, to perform the processes presented in the flowchart of FIG. 5, as will be described below.

System memory 120 further includes WAP location information data 230 and BPS altitude data 240. WAP location information data 230 is data received from WAP 190 about the location of WAP 190. WAP location information data 230 can include information such as WAP longitude data 232, WAP latitude data 234 and WAP altitude data 236. BPS altitude data 240 is altitude data received from BPS 146.

System memory 120 also includes altitude data difference 260 and altitude data difference threshold 262. Altitude data difference 260 is the absolute value of the difference between WAP altitude data 236 and BPS altitude data 240. Altitude data difference threshold 262 is a pre-determined altitude difference threshold. When altitude data difference 260 is greater than altitude data difference threshold 262, BPS 146 can require calibration. In one embodiment, altitude data difference threshold 262 can have a value greater than X meters, where X is a positive rational number above an acceptable altitude difference, e.g., 2 meters. In one embodiment, altitude data difference threshold 262 can have values ranging between 1 and Y meters, where Y is a value greater than 1 meter.

Figure 3:
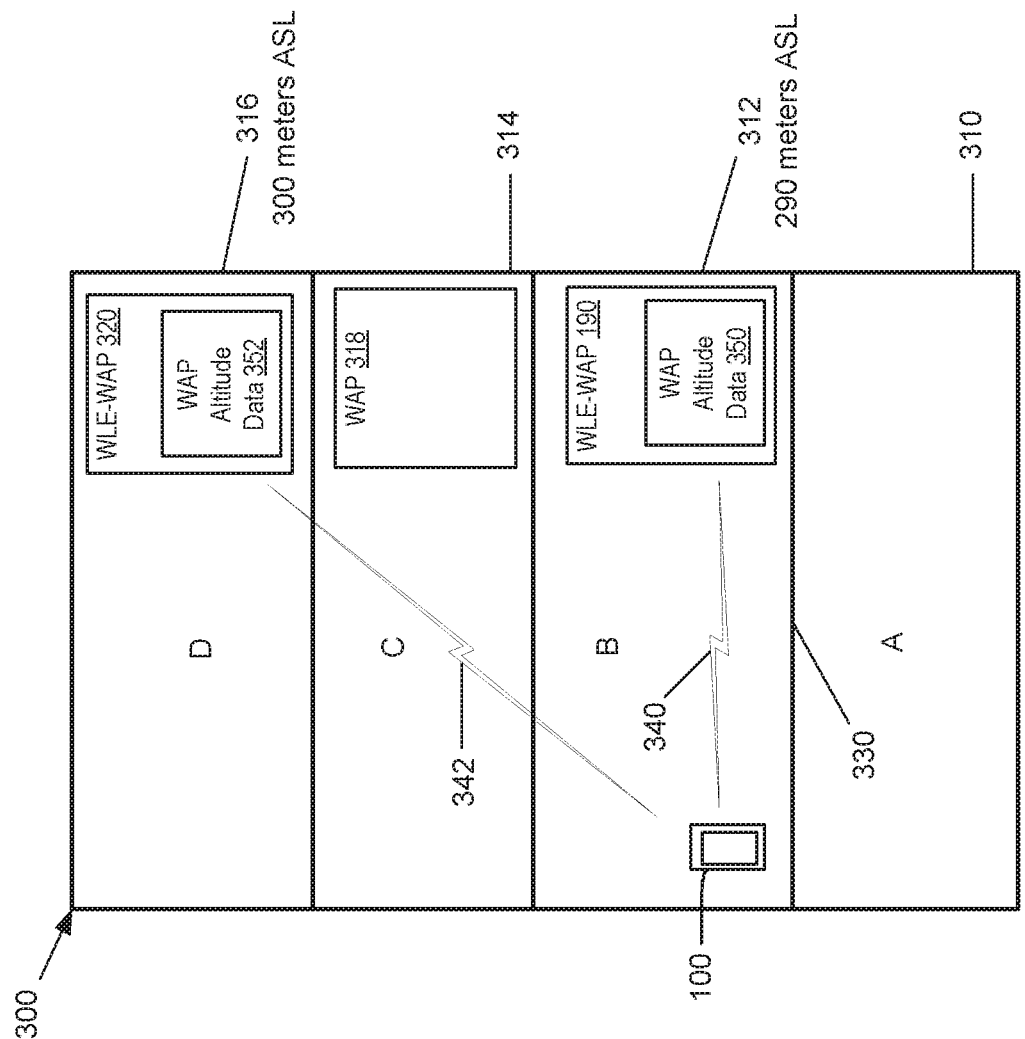
FIG. 3 is an example illustration of a mobile device inside a building, according to one or more embodiments.

FIG. 3 illustrates an example of mobile device 100 within a building 300. Building 300 has multiple levels A-D 310, 312, 314 and 316. Wi-Fi-location enabled (WLE)-WAP 190 is located on level B 312, WAP 318 is located on level C 314 and WLE-WAP 320 is located on level D 316. WLE-WAPs 190 and 320 are WAPs that store location information such as WAP LI data 230. WLE-WAPs 190 and 320 are WAPs that have been upgraded to support storing Wi-Fi location information such as such as WAP LI data 230. WLE-WAPs 190 and 320 can be upgraded to support storing Wi-Fi location information via a WAP firmware update or during the original equipment manufacturer (OEM) manufacturing process of the WLE-WAP. WAP 318 is a WAP that does not currently store WAP location information, but can be upgraded at a later time to a WLE-WAP. In one embodiment, level D 316 can be 300 meters above sea level (ASL) and level B 312 can be 290 meters ASL. WLE-WAP 190 periodically transmits beacon 340. Beacon 340 contains information about WLE-WAP 190 and other networks connected to WAP 190. Beacon 340 is transmitted periodically to announce the presence of WLE-WAP 190 to mobile devices such as mobile device 100. Second WLE-WAP 320 also periodically transmits beacon 342, which can be detected by mobile device 100 in situations when mobile device 100 is within beacon range of WLE-WAP 320.

In one embodiment, WLE-WAP 190 stores, in a memory device, location information that contains the physical location of WLE-WAP 190, which location data is detectable within the Wi-Fi beacon broadcasted by WLE-WAP 190. Short-range communication device 147 (FIG. 1) can detect and receive beacon 340 and establish communications with WLE-WAP 190. WLE-WAP 190 can store WAP altitude data 350 as a part of the location information. WAP altitude data 350 is pre-programmed or stored in WAP 190 during start-up or commissioning of WLE-WAP 190. WLE-WAP 190 can transmit WAP altitude data 350 as part of beacon 340 to short-range communication device 147. Mobile device 100 can receive WAP altitude data 350 from WLE-WAP 190 and store the data as WAP altitude data 236 (FIG. 2). Mobile device 100 can also receive second WAP altitude data 352 from another WLE-WAP 300 and compare the two or more received altitude data to determine which to store locally as WAP altitude data 236.

In one embodiment, when multiple WLE-WAP's are within communication range of short-range communication device 147, mobile device 100 can use received signal strength indication (RSSI) to determine which WLE-WAP has the strongest wireless signal and therefore is the closest WLE-WAP to mobile device 100. The WAP with the highest RSSI value in decibels (i.e., least negative or closest to zero) would be selected as the closest WAP to mobile device 100. In the illustrative embodiment, mobile device 100 selects the WLE-WAP 190, which is the closest WAP and also the WAP with highest RSSI, to receive WAP altitude data 350 from, based on the received beacon of WLE-WAP 190 having a higher RSSI than that of WLE-WAP 320. For example, in FIG. 3, if beacon 340 of WLE-WAP 190 has an RSSI value of −30 dB, WAP 318 has an RSSI value of −45 dB and beacon 342 of WLE-WAP 320 has an RSSI value of −65 dB, mobile device 100 would determine that WLE-WAP 190 is the closest (i.e., has the strongest RSSI) and would select WLE-WAP 190 as the source of altitude data 350. If only one WAP is present in building 300, mobile device 100 communicates with the single WAP to receive WAP altitude data 350.

Figure 4:
FIG. 4 is an example illustration of a list of location information providing the corresponding location and altitude of wireless access points, according to one or more embodiments.

Turning to FIG. 4, a list of WAP local information data 230 is shown. WAP local information data 230 includes WAP longitude data 232 (longitude in FIG. 4), WAP latitude data 234 (first LCI latitude in FIG. 4), and WAP altitude data 236 (altitude in FIG. 4). In one embodiment, WAP altitude data 236 is the height of WAP 190 above sea level. WAP local information data 230 further includes station height above floor 410 and station height above floor uncertainty 412. Station height above floor 410 is the height above the floor 330 of level 312 (FIG. 3) that WAP 190 is mounted. For example, WAP 190 could be mounted in a rack that is 3.5 meters above floor 330. Station height above floor uncertainty 412 is a plus or minus tolerance value for station height above floor 410. In an embodiment, mobile device 100 can use station height above floor 410 and station height above floor uncertainty 412 to more accurately calibrate BPS 146. In one embodiment, mobile device 100 can add and subtract station height above floor 410 to WAP altitude data 236 to generate upper and lower WAP altitude range values. The upper and lower WAP altitude range values are subtracted from BPS altitude data 240 and the absolute value of the differences are compared to altitude data difference threshold 262 to determine if BPS 149 is to be calibrated.

In one embodiment, processor 102, executing calibration module 136, can receive WAP altitude data 236 from WAP 190 via short-range communication device 147. Processor 102 triggers BPS 146 to send current BPS altitude data 240 to processor 102. In an alternative embodiment, processor 102 can retrieve or read BPS altitude data 240 directly from BPS 146. Processor 102 receives BPS altitude data 240 from BPS 146 via a wired connection between the components. Processor 102 calculates or determines altitude data difference 260 between WAP altitude data 236 and BPS altitude data 240. Processor 102 determines if altitude data difference 260 is greater than altitude difference threshold 262. In response to determining that altitude data difference 260 is greater than altitude difference threshold 262, processor 102 triggers BPS 146 to calibrate. According to one aspect of the disclosure, processor 102 can determine when BPS 146 requires calibration. According to a further aspect of the disclosure, processor 102 can initiate the calibration of BPS 146 based on WAP altitude data 236.

According to one aspect of the disclosure, when a difference in altitude between the altitude calculated by a BPS and the altitude where a WAP is located is greater than a threshold amount, the BPS performs a calibration procedure based on the altitude of the WAP location. BPS 146 has the capability to perform a calibration routine based on at least one of a provided altitude (i.e., WAP altitude data 236) or a provided barometric pressure. BPS 146 also includes additional pre-determined parameters used during a calibration routine such as offset, gain, temperature coefficients of offset and gain, and linearization parameters that are pre-programmed during manufacturing and stored in a non-volatile memory device within BPS 146.

In one embodiment, BPS 146 is an independent sensor in communication with processor 102, and short-range communication device 147 is an independent device/chip in communication with processor 102. In an embodiment, a biometric calibration module (i.e., calibration module 136) is used with at least one of either processor 102, a separate controller outside of processor 102, or a controller integrated on chip with BPS 149. The processor or controller periodically receives the Wi-Fi scan results, and checks if there is any WAP LI data 230 present. If LI data 230 is present, the processor or controller fetches the WAP LI data 230 including WAP altitude data 236. Processor 102 can compare BPS altitude data 240 to WAP altitude data 236. If there is a significance difference between BPS altitude data 240 and WAP altitude data 236, processor 102 causes BPS 149 to calibrate using WAP altitude data 236. In one embodiment, BPS 149 is first calibrated at the factory during manufacturing, using the altitude of the factory.

Figure 5:
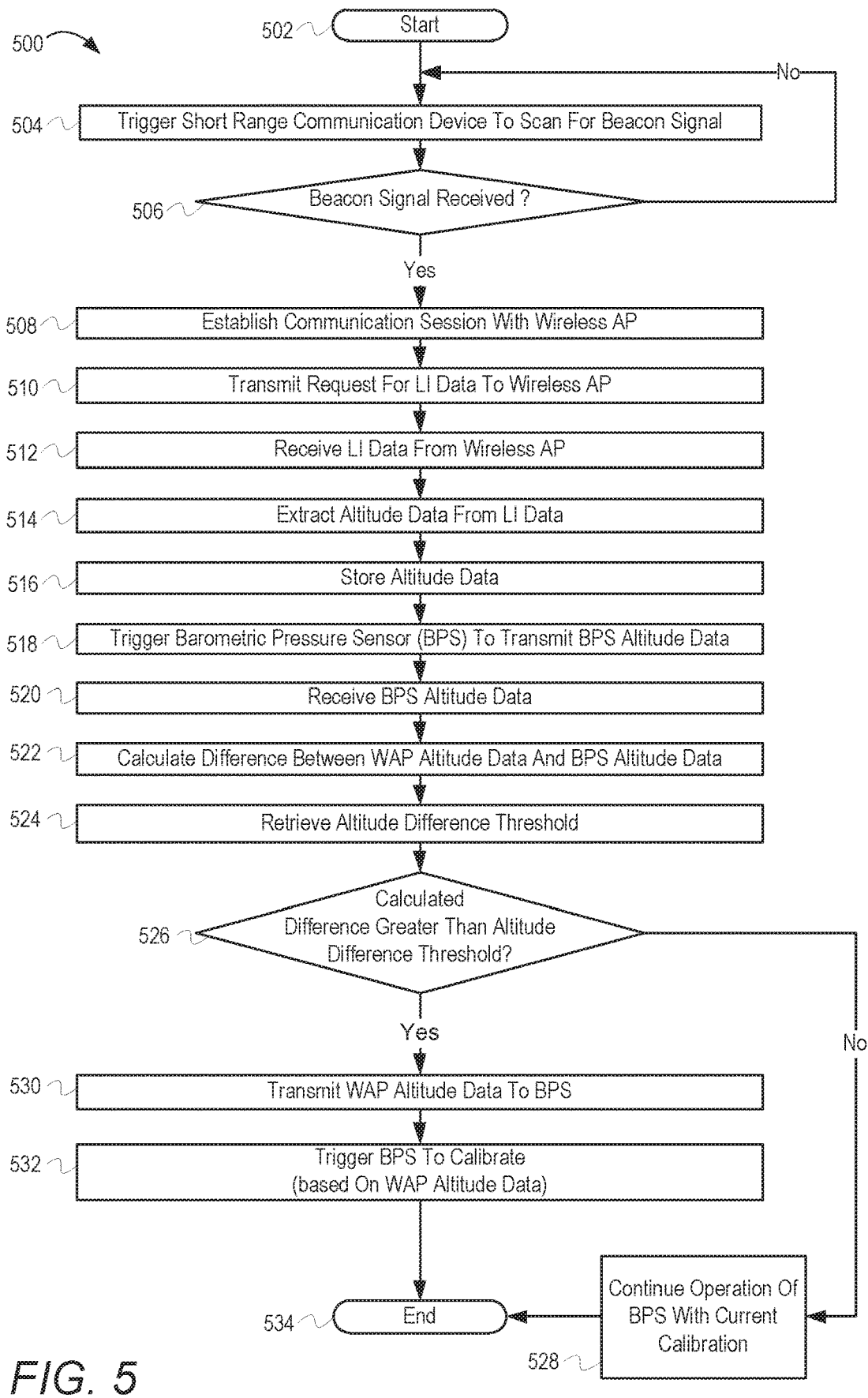
FIG. 5 depicts a flowchart of a method of calibrating a barometric pressure sensor of a mobile device, according to one or more embodiments.

FIG. 5 depicts a method 500 for calibrating a barometric pressure sensor (BPS) in a mobile device. The description of method 500 will be described with reference to the components and examples of FIGS. 1-4. The operations depicted in FIG. 5 can be performed by mobile device 100 or other suitable devices having a BPS. One or more of the processes of the methods described in FIG. 5 may be performed by a processor (e.g., processor 102) of mobile device 100 executing program code associated with calibration module 136.

Method 500 begins at start block 502. At block 504, processor 102 triggers short-range communication device 147 to scan for beacon signals generated by WAP 190. At decision block 506, processor 102 determines if a beacon signal has been received from WAP 190. In response to no beacon signal being received, processor 102 continues to trigger short range communication device 147 to periodically scan for beacon signals generated by WAP 190 at block 506.

In response to a beacon signal being received, processor 102 establishes a communication session with WAP 190 (block 508). Processor 102 transmits a request to WAP 190 for WAP location information data 230 (block 510). Processor 102 receives WAP location information data 230 from WAP 190 (block 510). Processor 102 extracts WAP altitude data 236 from WAP location information data 230 (block 514) and stores WAP altitude data 236 in system memory 120 (block 516). Processor 102 triggers BPS 146 to send BPS altitude data 240 (block 518) and receives BPS altitude data 240 (block 520). In an alternative embodiment, processor 102 can retrieve or read BPS altitude data 240 from BPS 146.

Processor 102 calculates the absolute value of the altitude data difference 260 between WAP altitude data 236 and BPS altitude data 240 (block 522). Processor 102 retrieves altitude data difference threshold 262 from system memory 120 (block 524). At decision block 526, processor 102 determines if altitude data difference 260 is greater than altitude data difference threshold 262. In response to altitude data difference 260 not being greater than altitude data difference threshold 262, processor 102 continues to operate BPS 146 with the current calibration (block 528). Method 500 then ends at end block 534.

In response to altitude data difference 260 being greater than altitude data difference threshold 262, processor 102 sends WAP altitude data 236 to BPS 146 (block 530). Processor 102 triggers BPS 146 to calibrate or perform a calibration (block 532). In one embodiment, BPS 146 performs the calibration routine based on WAP altitude data 236. Method 500 then terminates at end block 534. Calibration of BPS 146 based on WAP altitude data 236 results in increased accuracy of altitude measurements by BPS 146.

In the above-described methods of FIG. 5, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. A method comprising:
   receiving, via a processor of an electronic device, first altitude data from a first wireless access point;
   receiving second altitude data from a barometric pressure sensor of the electronic device;
   determining a first difference between the first altitude data and the second altitude data;
   determining if the first difference is greater than an altitude difference threshold;
   continuing to operate the barometric pressure sensor with a current calibration, in response to determining that the first difference is not greater than the altitude difference threshold; and
   in response to determining that the first difference is greater than the altitude difference threshold, triggering the barometric pressure sensor to calibrate.

2. The method of claim 1, further comprising:
   establishing, via a short-range communication device, a communication session with the first wireless access point; and
   transmitting a request to the first wireless access point to transmit location information associated with the first wireless access point.

3. The method of claim 2, further comprising:
   receiving the location information; and
   extracting the first altitude data from the location information.

4. The method of claim 1, further comprising:
   transmitting the first altitude data to the barometric pressure sensor for use in calibrating the barometric pressure sensor.

5. The method of claim 1, wherein the first altitude data further comprises at least one of altitude above sea level data, height above floor data, and height above floor uncertainty data.

6. The method of claim 1, wherein the altitude difference threshold is greater than X meters, where X is a positive rational number above an acceptable altitude difference.

7. An electronic device comprising:
   a barometric pressure sensor;
   a memory having stored thereon an altitude difference threshold and a calibration module for calibrating the barometric pressure sensor;
   a short-range communication device that enables communication with at least one wireless access point; and
   at least one processor communicatively coupled to the barometric pressure sensor, the memory, and the short-range communication device, the at least one processor executing program code of the calibration module which enables the electronic device to:
receive first altitude data from the at least one wireless access point;
receive second altitude data from the barometric pressure sensor;
determine a first difference between the first altitude data and the second altitude data;
retrieve the altitude difference threshold from the memory;
determine if the first difference is greater than the altitude difference threshold;
continue to operate the barometric pressure sensor with a current calibration, in response to determining that the first difference is not greater than the altitude difference threshold; and
in response to determining that the first difference is greater than the altitude difference threshold, trigger the barometric pressure sensor to calibrate.

8. The electronic device of claim 7, wherein the processor is further enabled to:
establish a communication session with the first wireless access point; and
transmit a request to the first wireless access point to transmit location information associated with the first wireless access point.

9. The electronic device of claim 8, wherein the processor is further enabled to:
receive the location information; and
extract the first altitude data from the location information.

10. The electronic device of claim 7, wherein the processor is further enabled to:
transmitting the first altitude data to the barometric pressure sensor for use in calibrating the barometric pressure sensor.

11. The electronic device of claim 7, wherein the first altitude data further comprises at least one of altitude above sea level data, height above floor data and height above floor uncertainty data.

12. The electronic device of claim 7, wherein the altitude difference threshold is greater than X meters, where X is a positive rational number above an acceptable altitude difference.

13. A computer program product comprising:
a non-transitory computer readable storage device with program code stored thereon which, when executed by one or more processors of an electronic device having a barometric pressure sensor, a short-range communication device, and a memory, enables the electronic device to complete the functionality of:
receiving first altitude data from a first wireless access point;
receiving second altitude data from the barometric pressure sensor;
determining a first difference between the first altitude data and the second altitude data;
determining if the first difference is greater than an altitude difference threshold;
continuing to operate the barometric pressure sensor with a current calibration, in response to determining that the first difference is not greater than the altitude difference threshold; and
in response to determining that the first difference is greater than the altitude difference threshold, triggering the barometric pressure sensor to calibrate.

14. The computer program product of claim 13, wherein the program code further comprises program code that further enables the electronic device to complete the functionality of:
establishing a communication session with the first wireless access point; and
transmitting a request to the first wireless access point to transmit location information associated with the first wireless access point.

15. The computer program product of claim 14, wherein the program code further comprises program code that further enables the electronic device to complete the functionality of:
receiving the location information; and
extracting the first altitude data from the location information.

16. The computer program product of claim 13, wherein the program code further comprises program code that further enables the electronic device to complete the functionality of:
transmitting the first altitude data to the barometric pressure sensor for use in calibrating the barometric pressure sensor.

17. The computer program product of claim 13, wherein the first altitude data further comprises at least one of altitude above sea level data, height above floor data and height above floor uncertainty data.

* * * * *